(No Model.)
9 Sheets—Sheet 1.

H. C. HERR.
MEANS FOR MAKING CELL CASES.

No. 586,519. Patented July 13, 1897.

Fig 1

Witnesses,
A. J. Sangster.
L. M. Spong.

Henry C. Herr. Inventor.
By James Sangster Attorney.

(No Model.) 9 Sheets—Sheet 2.

H. C. HERR.
MEANS FOR MAKING CELL CASES.

No. 586,519. Patented July 13, 1897.

Fig. 2

Witnesses,
A. J. Sangster
L. M. Spong.

Henry C. Herr, Inventor.
By James Sangster, Attorney.

(No Model.) 9 Sheets—Sheet 3.
H. C. HERR.
MEANS FOR MAKING CELL CASES.

No. 586,519. Patented July 13, 1897.

Fig.3

Witnesses,

Henry C. Herr, Inventor.

By James Sangster, Attorney.

(No Model.) 9 Sheets—Sheet 5.

H. C. HERR.
MEANS FOR MAKING CELL CASES.

No. 586,519. Patented July 13, 1897.

Witnesses,

Henry C. Herr. Inventor.
By James Sangster, Attorney.

(No Model.) 9 Sheets—Sheet 6.

H. C. HERR.
MEANS FOR MAKING CELL CASES.

No. 586,519. Patented July 13, 1897.

Witnesses,
A. J. Sangster
L. M. Spong.

Henry C. Herr, Inventor.
By James Sangster, Attorney.

(No Model.) 9 Sheets—Sheet 7.

H. C. HERR.
MEANS FOR MAKING CELL CASES.

No. 586,519. Patented July 13, 1897.

Witnesses,
A. J. Sangster
L. M. Strong.

Henry C. Herr, Inventor.
By James Sangster, Attorney.

(No Model.) 9 Sheets—Sheet 8.
H. C. HERR.
MEANS FOR MAKING CELL CASES.
No. 586,519. Patented July 13, 1897.

Witnesses,

Henry C. Herr, Inventor.
By James Sangster, Attorney.

(No Model.)   9 Sheets—Sheet 9.

H. C. HERR.
MEANS FOR MAKING CELL CASES.

No. 586,519.   Patented July 13, 1897.

Witnesses:   Henry C. Herr   Inventor.
By James Sangster, Attorney.

UNITED STATES PATENT OFFICE.

HENRY C. HERR, OF PORT HURON, MICHIGAN, ASSIGNOR TO THE AMERICAN EGG CASE COMPANY, OF SAME PLACE.

MEANS FOR MAKING CELL-CASES.

SPECIFICATION forming part of Letters Patent No. 586,519, dated July 13, 1897.

Application filed August 17, 1896. Serial No. 602,980. (No model.)

*To all whom it may concern:*

Be it known that I, HENRY C. HERR, a citizen of the United States, residing at Port Huron, in the county of St. Clair and State of Michigan, have invented certain new and useful Improvements in the Means for Making Cell-Cases, of which the following is a specification.

My invention relates to a new and useful means for making cell-cases in which eggs are packed for transportation, and it will be fully and clearly hereinafter described and claimed, reference being had to the accompanying drawings, in which—

Fig. 28 is a perspective view showing a lower series of paper blanks and a transverse upper series of paper blanks all in their required positions just prior to being pressed together, as will appear farther on.

Referring to the drawings for the details of the machine, 1 represents the table upon which the mechanism is supported. It is provided with legs 2, made, preferably, of cast-iron and secured together in the usual way by screw-bolts 3.

The main driving-shaft 4 (see Figs. 1 and 2) is mounted in boxes 5 and 6.

The driving-pulley 7 is rigidly secured to the driving-shaft, and at the end of the shaft is fastened a pinion 8, which gears in with a spur-wheel 9 (see Fig. 2) on the crank-shaft 10, which operates the punching and feeding mechanism for making the lower cell-blanks.

The crank-shaft 10 (see Figs. 1, 2, and 3) is mounted in boxes 11, 12, and 13, located on suitable supporting-frames. (Shown in Figs.

Figure 1:
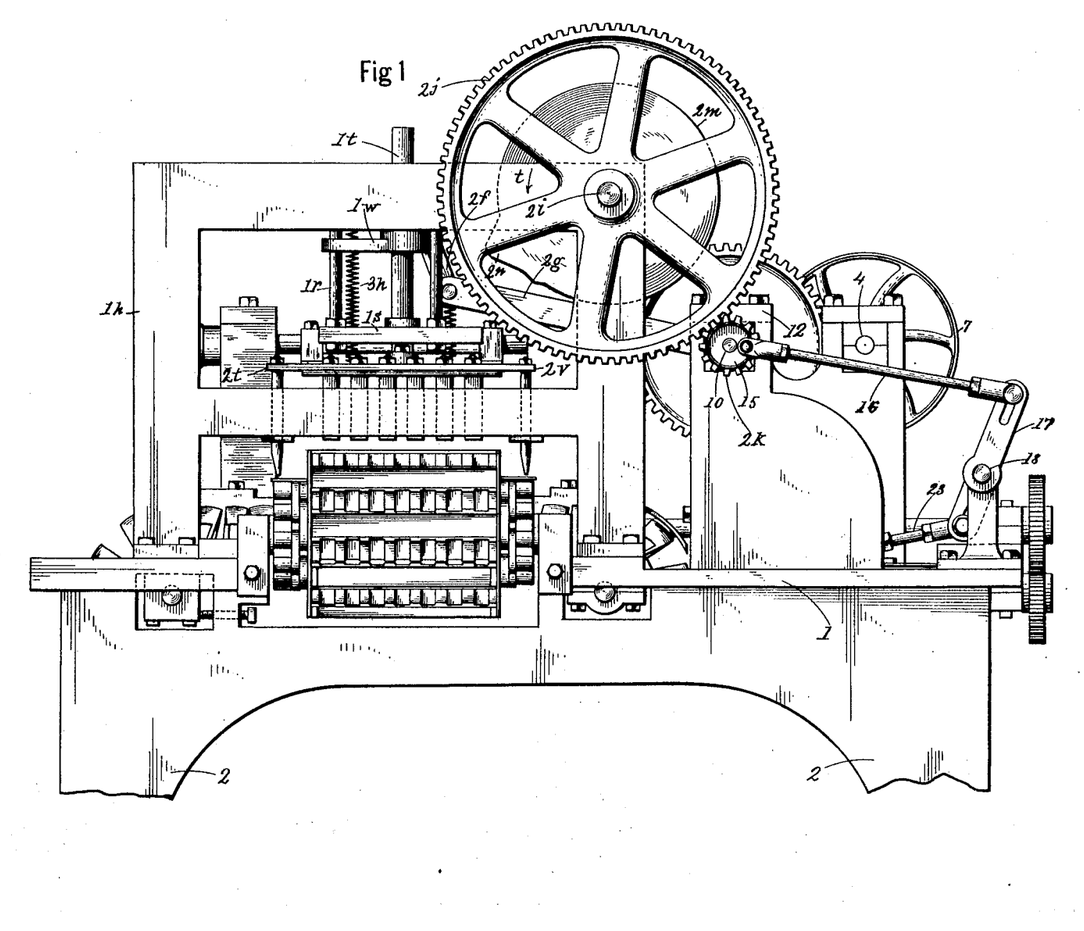
Figure 1 represents a side elevation taken from that side of the machine showing the outside spur gear-wheel and pinion for operating the beaters.
Figure 2:
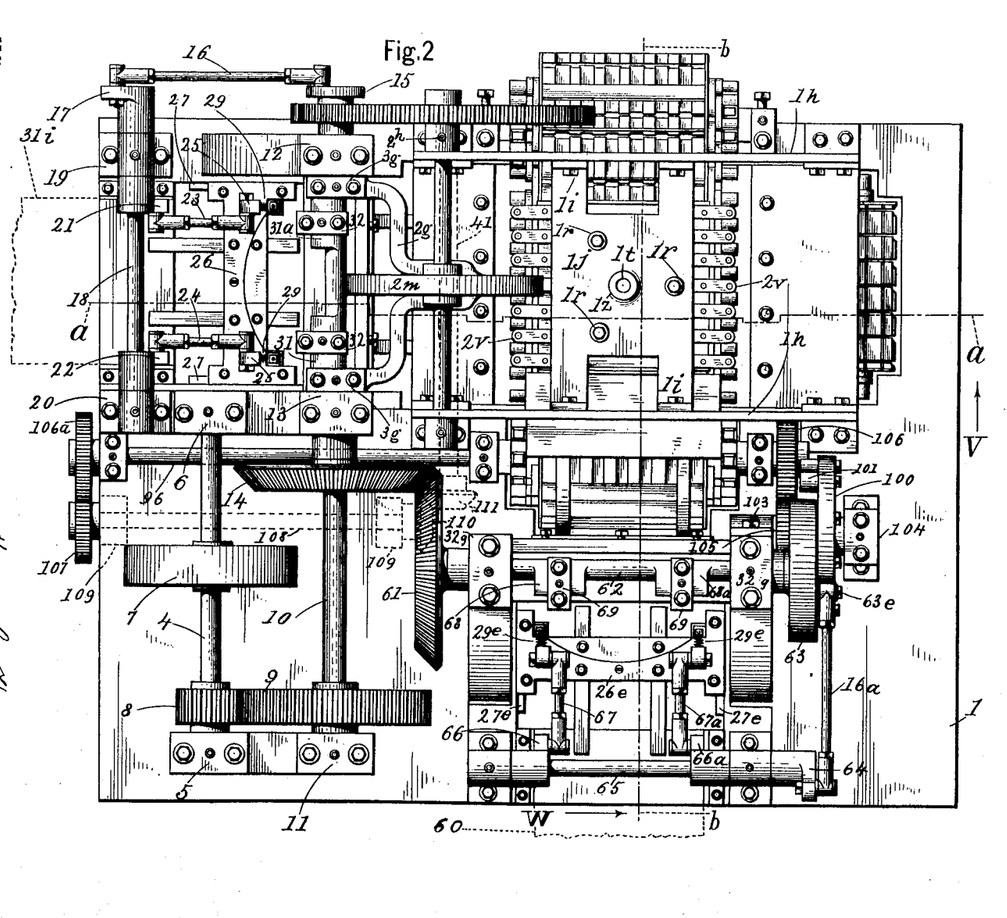
Fig. 2 represents a top plan view of the machine complete.
Figure 3:
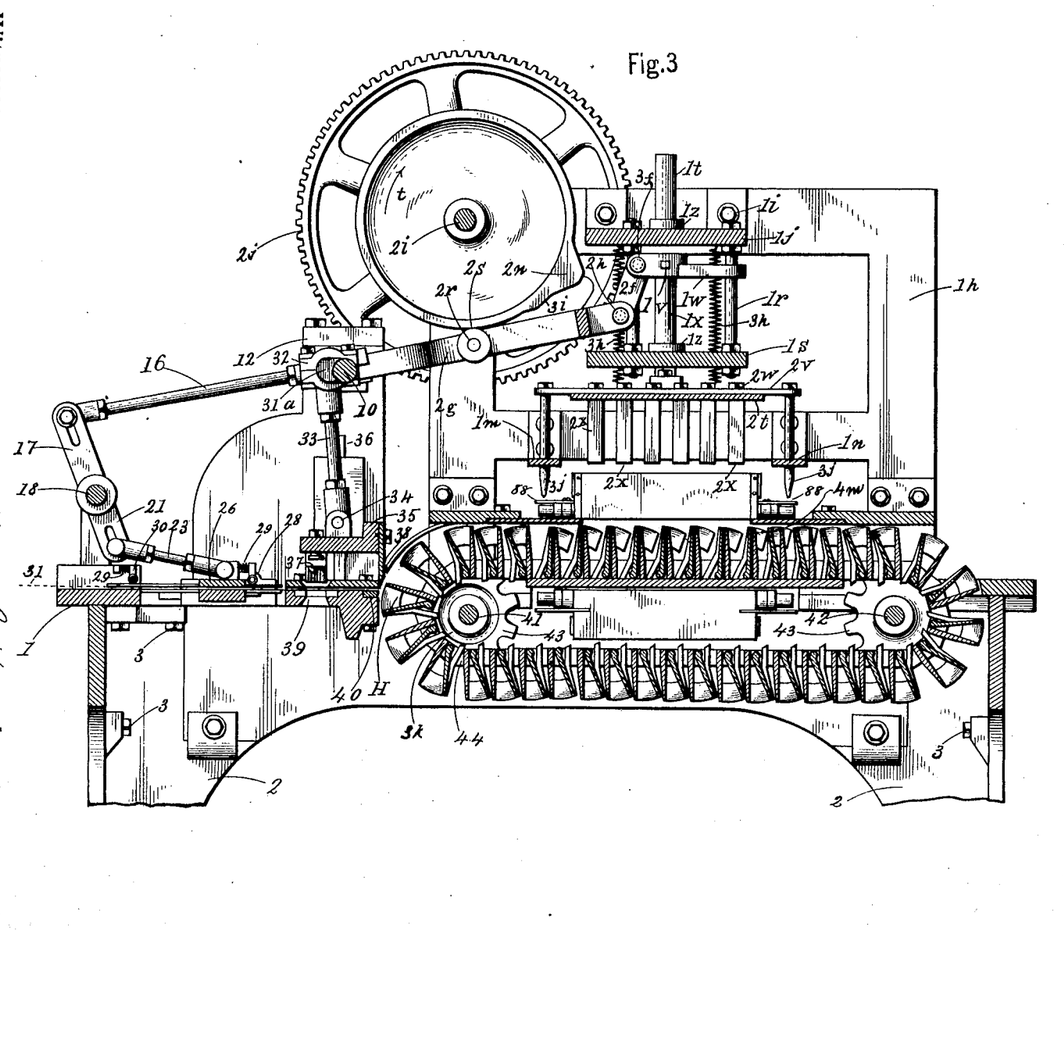
Fig. 3 is a vertical longitudinal section through the machine on or about line $a\ a$, Fig. 2, looking in the direction of the arrow V.

1, 2, and 3.) The crank-shaft 10 is also provided with a large miter gear-wheel 14, the office of which will appear farther on.

At the end of the crank-shaft 10 is secured a small crank-disk 15, having a connecting-rod 16 pivoted to the crank-disk at one end and to an arm 17 at the opposite end. The arm 17 is rigidly secured to a shaft 18, mounted in boxes 19 and 20. On the shaft 18 are secured two crank-arms 21 and 22, to each of which is pivoted one end of a connecting-rod, the connecting-rod 23 being pivoted to the crank-arm 21 and the connecting-rod 24 to the crank-arm 22. The opposite ends of these connecting-rods are pivoted to holding-pieces 25 on the feed-bar 26. (Shown in Figs. 2 and 3.) This feed-bar 26 extends across this part of the machine and its ends rest on slideways 27, (see Fig. 2,) so that it can be reciprocated back and forth horizontally by the operation of the connecting-rods 23 24, which receive their motion from the crank-arms 21 22 and the shaft 18.

The feed-bar 26 is provided with the usual friction-pawls 28, pivoted to the said feed-bar. The upper ends of the pawls 28 project up, and spiral springs 29 keep them in position so they rest with the necessary pressure against the paper. (See Figs. 2 and 3.)

Back of the friction-pawls 28 is a series of friction-pawls 30 of exactly the same construction as the pawls 28 and their springs 29. They are pivoted to stationary parts of the machine.

The office of the pawls 28 is to feed the paper 31 (see Fig. 3) forward with the feeding-bar 26, and the stationary pivoted pawls 30 prevent the paper from being moved back.

The shaft 18 receives a rocking movement from the crank-disk 15, rigidly secured to the crank-shaft 10, which is rotated by the driving-shaft 4 and its connecting-gearing 8 and 9. (See Fig. 2.)

The crank-shaft 10 is provided with two double cranks 31 31$^a$, (see Figs. 2 and 3, where this is more clearly shown,) to which are connected by boxes 32 two depending arms 33, the lower ends of which connect by pins 34 with a transverse vertically-movable bar 35, mounted in vertical slideways 36, a portion of one being shown in Fig. 3.

Figure 12:
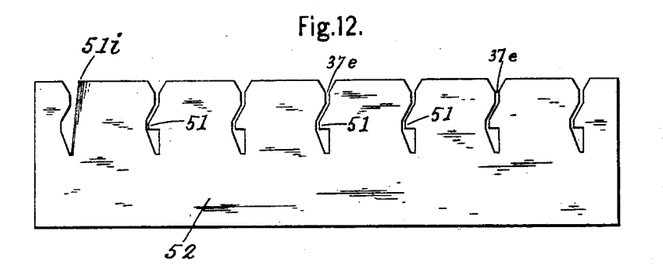
Fig. 12 represents a side elevation of one of the blanks forming a portion of a cell-case.

To the under side of the transverse bar 35 is rigidly secured a series of seven punches 37 for punching the openings 37$^e$ in the lower paper blank. (See Fig. 12.) Rigidly secured to its rear side is a cutter 38 for cutting off the blanks after they have been punched and fed into the clamping and holding jaws. 39 represents one of the series of lower punch-dies, and 40 the lower cutting-die. (See Fig. 3.)

The punches 37 and cutter 38 all being secured to the transverse vertically-movable bar 35 receive their required vertical movements by means of their connecting-arms 33 and the crank-shaft 10.

41 and 42 represent the lower sprocket-chain shafts, each carrying a pair of sprocket gear-wheels 43. (See Fig. 3, where a section is shown through the shafts 41 and 42, showing one of said sprocket-wheels on each shaft and portions of the lower sprocket-chain links 44. See also Figs. 5, 6, 8, and 15, where the links of this chain are more clearly shown.)

Figure 9:
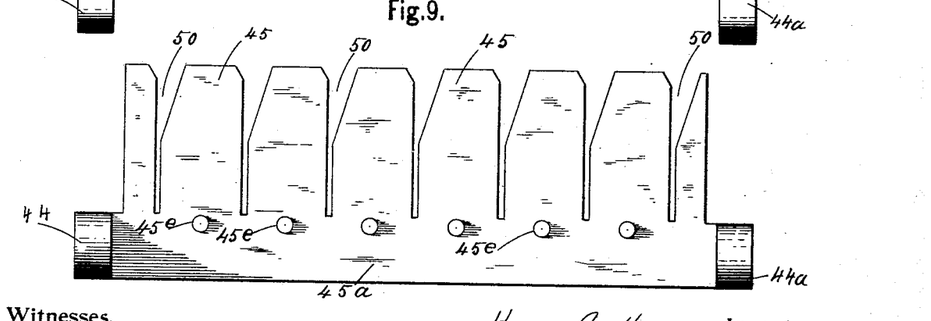
Fig. 9 represents a side elevation of Fig. 8.

The lower sprocket-chain link consists of the two pivotal links 44 and 44$^a$ (see Figs. 8 and 9) and a series of clamping-jaws 45, forming one member of a pair of clamping-jaws. These members 45 may be secured to the cross-bar, or what is the better and preferable way is to form the whole in one integral piece, substantially as shown in said Figs. 8 and 9.

Figure 10:
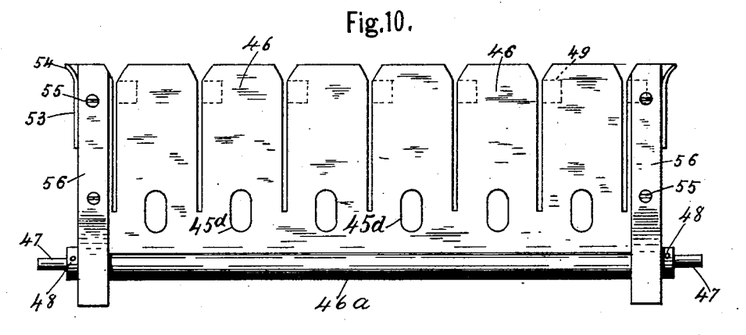
Fig. 10 represents a detached side elevation of the opposite member of the pair of lower endless-chain-carrier forming and clamping jaws.
Figure 11:
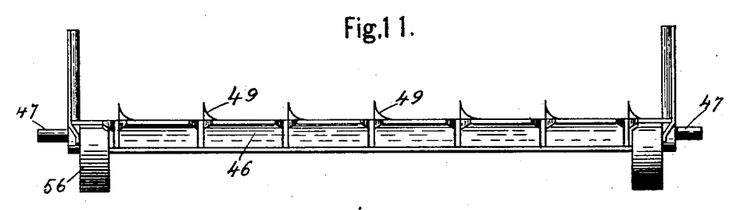
Fig. 11 represents a top plan view of Fig. 10.

The base 45$^a$ of the jaws 45 extends from link to link and is provided with a series of pins 45$^e$, the office of which is to prevent the cell-blank from falling down through between the clamping-jaws, the paper blank being in between them some little time before said jaws are fully closed. These pins 45$^e$ extend into openings 45$^d$ in the movable jaws shown in Fig. 10.

Figure 7:
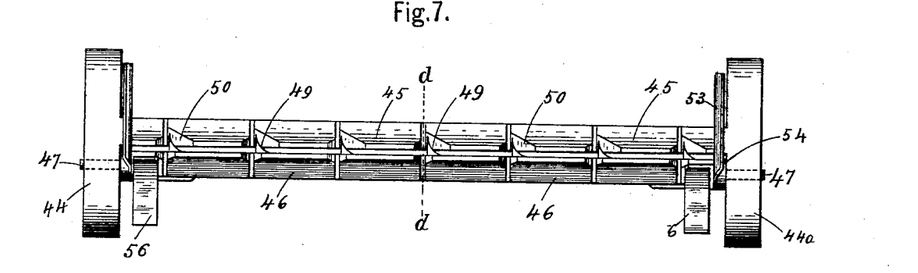
Fig. 7 represents an enlarged plan view of one pair of the lower endless-chain-carrier forming and clamping jaws.
Figure 8:
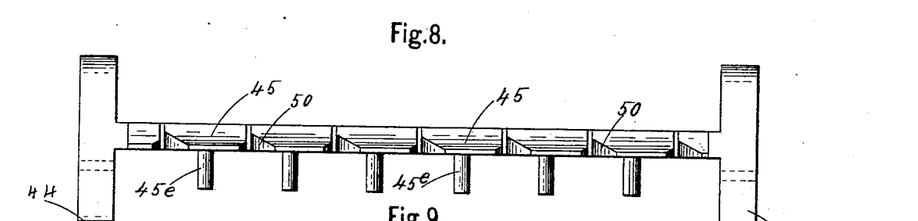
Fig. 8 represents a detached plan view of one part of a pair of the lower endless-chain-carrier forming and clamping jaws.

Referring now to Figs. 7, 10, 11, 15, and 16, showing the combined series of movable clamping and forming jaws 46, forming the other member of the pair, the lower part, forming the movable clamping-jaw bar 46$^a$ of the clamping-jaws 46, extends from one link 44 to the other link 44$^a$ and is provided at each end with a removable pivotal pin 47, (see Figs. 10 and 11,) which extends through each link 44 and 44$^a$, as shown at 47 in Fig. 7. It is necessary that the pivotal pins 47 be removable, because the movable clamping-jaw bar 46$^a$ could not be put in place between the links 44 44$^a$ if the pins 47 were in one piece with it. The pivotal pins are fitted in holes at each end of the clamping-jaw bar 46$^a$ and secured by dowel-pins 48, (see Fig. 10,) but they may be screwed in or secured in any well-known way. To one side of each one of the series of movable jaws is an outward-extending forming portion having one curved side 49. (See Figs. 7 and 11, where these portions are shown.) These curved forming portions extend into and through the openings 50, between the forming-jaws 45. (See Figs. 7, 8, and 9.)

Figure 13:
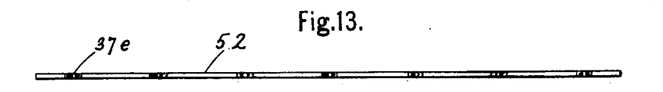
Fig. 13 represents a top view of one of the cell-case blanks before being formed.
Figure 14:
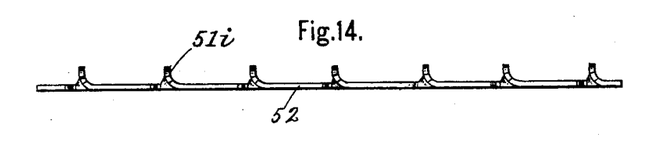
Fig. 14 represents a top plan view of one of the cell-case blanks after being formed.

The object of the curved forming portions is to provide a suitable means for turning the hook portions 51 of the lower paper egg-cell blank 52 outward to one side, as shown at 51$^1$ in Fig. 14, (see also Figs. 12 and 13,) for the purpose of allowing a free opening for the upper egg-cell blank to enter, as will appear more clearly when describing the operation of the machine.

At both ends of each series of movable jaws 46 is secured to said jaws a flat plate 53, having an outward-curved edge 54. (See Figs. 6, 7, and 10.) The object of these end pieces 53 is to inclose the space at each end between the clamping-jaws when they are opened.

At the back of and at each end of the movmoved into the holding-jaws and cut off, require some means for preventing them from dropping down through between the jaws while open.

Figure 19:
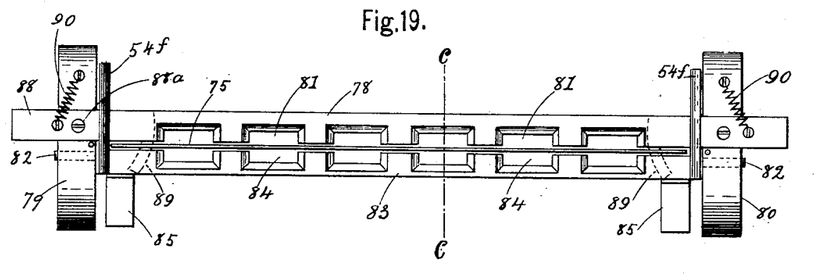
Fig. 19 represents a top plan view of a pair of the upper endless-chain-carrier-holding jaws, showing the jaws in their closed position.
Figure 23:
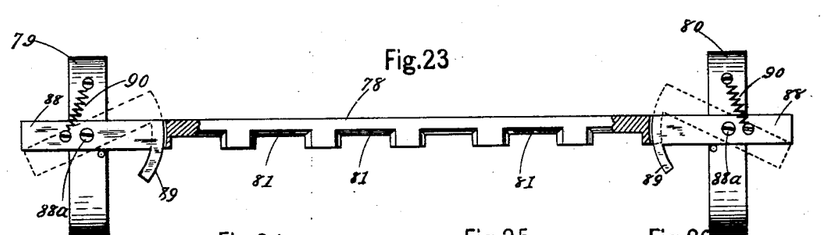
Fig. 23 represents one member of a pair of the upper endless-chain-carrier-holding jaws, showing a portion of the ends cut away to expose the horizontally-pivoted movable bottom bars.

Referring to Figs. 19 and 23, 88 represents a flat-hook-shaped plate horizontally pivoted by a pin 88ª to the top side of the links 79 and 80. The hook-shaped portions 89 of the plates 88 extend into openings in the ends of the stationary holding-jaw 78. (See Figs. 3, 19, and 23.) A spiral spring 90 keeps the pivoted plates 88 in the normal position shown in Fig. 19. The object of the pivoted plates 88 is to close the bottoms of the holding-jaws 78 and 83, and thereby prevent the paper blanks 75 from falling through until the proper time.

At each end of the movable jaw 83 is secured a flat plate 53ᶠ, having its upper edge 54ᶠ curved outward, the object of which is to close the end of the opening between the said jaws, and thus prevent the paper strips from slipping sidewise therefrom.

Figure 17:
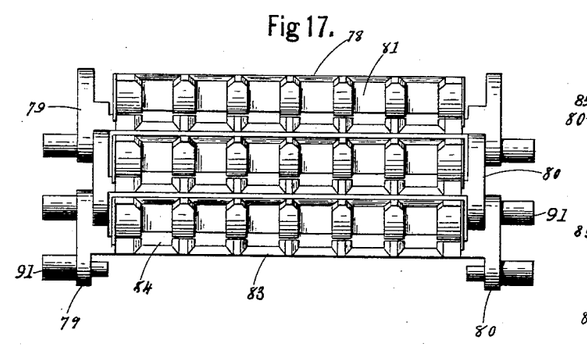
Fig. 17 represents a top plan view of a detached portion of the upper endless-chain carrier, showing several of the links.
Figure 18:
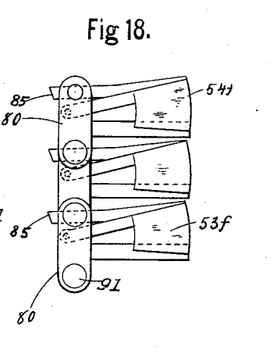
Fig. 18 represents an end view of Fig. 17.
Figure 21:
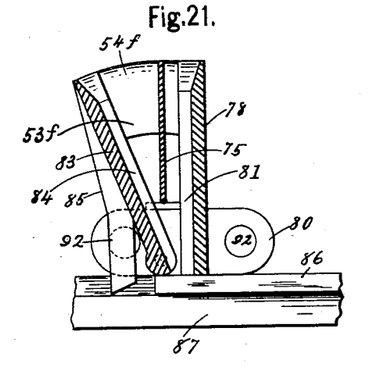
Fig. 21 is a cross-section through a pair of the upper chain-carrier jaws, the view showing the jaws open and taken on or about the line $c\ c$, Fig. 19.
Figure 22:
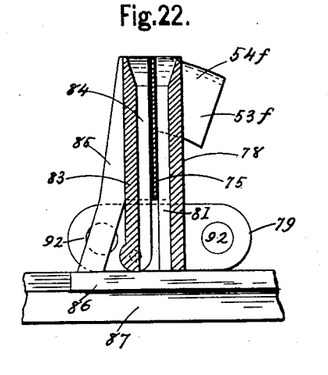
Fig. 22 represents a cross-section on or about line $c\ c$ through Fig. 19.

The links 79 and 80, comprising the upper chain, are pivoted together by removable pins 91. (Shown in Figs. 17 and 18.) These pins pass through holes 92 in the links (shown in Figs. 21 and 22) and are firmly secured in place either by passing the pin through an easily-fitting hole in one link and securing it to the other link by a dowel-pin or other well-known means. These chain-links are put together in the well-known way to form an endless sprocket-chain adapted to fit and operate on the sprocket-wheels 93 and 94. (See Fig. 4.) The lower sprocket-chain, composed of the links 44 and 44ª, is also put together by removable pins 44ᵉ, (see Fig. 5,) which are secured substantially in the same manner as the links 79 and 80, thereby forming an endless sprocket-chain adapted to fit and be operated by the sprocket gear-wheels 43.

The shafts 95 and 96 are each provided with two sprocket-wheels, upon which the upper chains are operatively mounted, (see Fig. 4,) the shaft 96 being also shown in Fig. 2.

Figure 4:
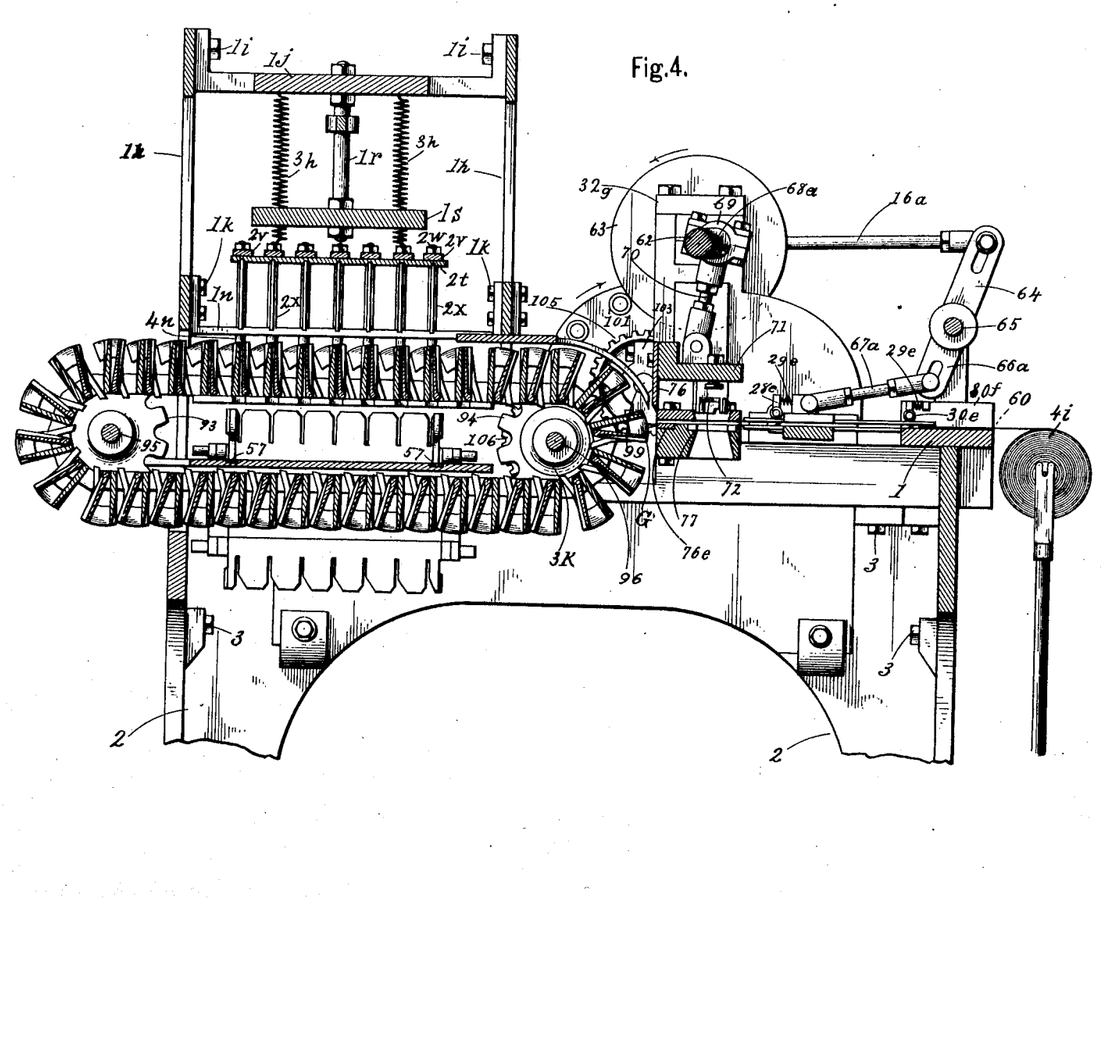
Fig. 4 represents a vertical transverse section on or about line $b\ b$, Fig. 2, looking in the direction of the arrow W.
Figures 5, 6:
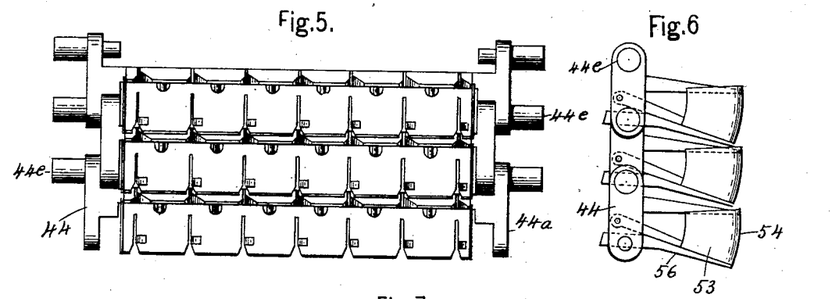
Fig. 5 represents a detached top view of a portion of the lower endless-chain carrier, showing several links of the chain.
Fig. 6 represents an end view of Fig. 5.
Figures 24, 25:
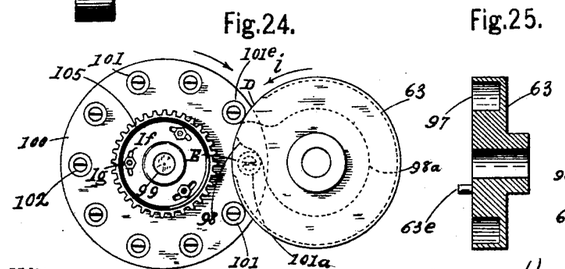
Fig. 24 represents a detached side elevation of the mechanism for intermittingly driving and locking the upper and lower carrier-chains, also mechanism for adjusting the endless-chain carriers.
Fig. 25 represents a vertical section through the cam-wheel.
Figure 26:
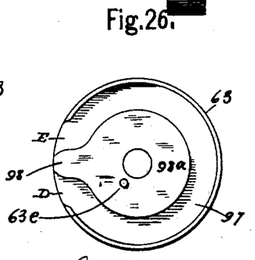
Fig. 26 represents an inside face view of the cam-wheel shown in Fig. 25.

The mechanism for operating the upper and lower endless carrier-chains is shown in Figs. 2 and 4 and the details in Figs. 24, 25, and 26.

On the shaft 62 is rigidly secured a cam-wheel 63. The construction of this cam is better shown in Figs. 24, 25, and 26. It is a grooved cam. The groove cam-track 97 (see Figs. 25 and 26) extends nearly around the disk from the entrance-point D on one side of the spur-tooth 98 (see Fig. 25) to the outlet E on the opposite side of said tooth. The portions 98 and 98ª of the cam form substantially a mutilated gear.

On the shaft 99, which is mounted in boxes 103 and 104, (see Figs. 2 and 4,) is a circular disk 100, having a series of ten friction-rollers 101, ten being used in this instance because there are ten teeth in the sprocket-wheels. The number may be varied; but the number of teeth in the sprocket-wheels and rollers on the disk-wheel must correspond. The object of this correspondence is to have the sprocket-wheels divided in the same number of movements per revolution as the disk-wheel, so as to bring the clamping and holding jaws always at a fixed point at the end of the intermittent movements. These rollers are secured to the disk 100 by their holding-pins 102. They are mounted on the disk 100 in a true circle and of equal distances apart, said distance being such that the cam-tooth 98 will truly gear in and move between them.

The cam-wheel 63, moving in the direction of the arrow $i$ when the cam-tooth 98 is in the position shown in Fig. 24, by dotted lines, will move the roller (we will say, for illustration, 101ª) it is in contact with (also shown by dotted lines in said Fig. 24) out of the cam groove or track 97 at the point E, turning the disk with it, and the roller 101ᵉ on the opposite side of the cam-tooth at the same time moves into the cam-groove at the inlet D, the rear roller 101ᵉ taking the place in the cam-groove vacated by the roller 101ª.

It will be observed that while the rollers are in the position above set forth the cam-wheel will have to make an entire revolution before the same operation is again repeated. It will also be seen that while one of the rollers is thus in the cam-groove and the cam rotating there will be two of the said rollers in contact with the periphery of the cam-wheel 63, (see Fig. 24,) thereby locking the disk-wheel and its rollers while the cam-wheel is completing its revolution, or until it is in position to repeat the operation of again moving the disk 100 another step.

Every time the disk 100 makes one of its partial rotations it transmits its said movement to the gear-wheel 105. (See Figs. 2 and 4.) From thence it is transmitted to a gear-wheel 106, rigidly secured to the shaft 96, thereby giving the upper sprocket-chain its required intermittent movement at the same time. The shaft 96 extends out to one end of the table and is provided with a spur gear-wheel 106ª, rigidly secured to it.

The spur gear-wheel 106ª gears in with the spur-gear 107, which is rigidly secured to a shaft 108, (shown by dotted lines in Fig. 2,) mounted in suitable boxes 109 below the table. (Also shown by dotted lines in Fig. 2.) At the opposite end of the shaft 108 is secured a miter gear-wheel 110. (Shown in dotted lines in said Fig. 2.) The miter gear-wheel 110 gears in with the miter gear-wheel 111. (See dotted lines in Fig. 2.) As the miter gear-wheel 111 is rigidly secured to the shaft 41, (shown in Figs. 2 and 3,) it gives the lower sprocket-chain 44 and 44ª and its clamping-jaws their proper intermittent movements at right angles to the movements of the upper sprocket-chain.

It will be observed from the above-described construction that the upper and lower sprocket-chains are driven simultaneously by their able jaw 46 is secured by screws 55 (see Fig. 10) an operating-bar 56. (See Figs. 6, 10, 15, and 16.)

Figure 15:
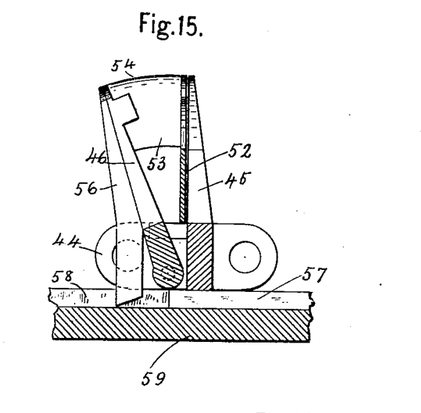
Fig. 15 represents a vertical section cutting transversely through a pair of the lower open endless-chain-carrier clamping and forming jaws on or about line $d\ d$, Fig. 7.
Figure 16:
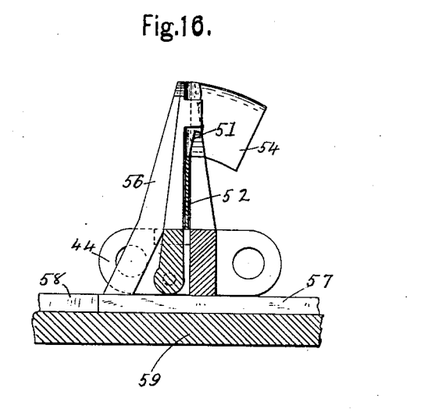
Fig. 16 represents a vertical section through line $d\ d$, Fig. 7.

The office of the operating-bars 56 is to close the movable jaws 46. This is illustrated in Figs. 15 and 16, in which they are shown in their open and closed positions.

The lower ends of the operating-bars 56 are flat and adapted to slide over removable steel tracks 57. (Shown in cross-section in Fig. 4.) They are fitted in grooves 58 in the table 59 and are only long enough to operate the jaws 46 while holding a lower paper blank in position to receive an upper paper blank, and when the lower ends of the operating-bars pass off from the steel tracks the jaws open, as in Fig. 15, and close again when they pass over the tracks, as in Fig. 16.

The mechanism for feeding, punching, cutting, and placing the upper paper blanks in position in the upper chain-carrier jaws is shown in Figs. 2, 3, and 4. The paper from which the upper cell-blanks are made enters the machine at the point shown by the dotted lines 60, (see Figs. 2 and 4,) the paper in this instance being fed into the machine at right angles to the direction in which the paper for the lower blanks is fed. The feeding mechanism consists of feed-bar 26$^e$, which extends across this part of the machine and its ends rest on slideways 27$^e$. (See Fig. 2.) The feed-bar is provided with a series of the usual friction-pawls 28$^e$, pivoted thereto. The upper ends of the pawls 28$^e$ extend upward, and spiral springs 29$^e$ are interposed between said upward extensions and stationary portions on the feed-bar 26$^e$ to keep them in position, so they will rest with a spring force on the paper. (See Figs. 2 and 4.)

At the rear of the friction-pawls 28$^e$ is a series of friction-pawls 30$^e$ of similar construction to the pawls 28$^e$. These pawls 30$^e$ are pivoted to a stationary portion 30$^f$ of the machine.

The pawls 28$^e$ feed the paper for the upper blanks into the machine, and the pawls 30$^e$ prevent the paper from being moved back.

It will be noticed that the above-described feeding mechanism is substantially the same as that described for the feeding mechanism for the paper forming the lower paper cell-blanks. This feeding mechanism receives its required movements by means of the driving-pulley 7 and shaft 4, which transmit a rotary motion from the gearing 8 and 9 to the shaft 10 and miter gear-wheel 14. From thence motion is communicated to the miter gear-wheel 61 (see Fig. 2) and to the crank-shaft 62. On the outer end of the crank-shaft 62 is mounted a cam wheel or disk 63, to which is pivoted by a pin 63$^e$ one end of a connecting-rod 16$^a$. (See Figs. 2 and 4.) The opposite end of the connecting-rod is pivoted to a crank-arm 64 on the rock-shaft 65.

To the rock-shaft 65 is rigidly secured two arms 66 and 66$^a$, to one of which is pivoted the connecting-rod 67 and to the other the connecting-rod 67$^a$, their opposite ends being pivoted to ears on the feed-bar 26$^e$ to give it the proper reciprocating feed movements.

Figure 20:
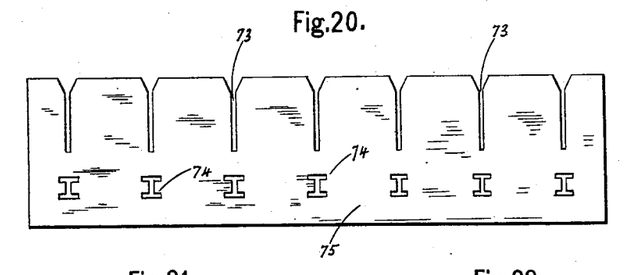
Fig. 20 is a side elevation of one of the cell-blanks such as are carried between the jaws represented in Fig. 19, as will appear farther on, a top edge view of one of said cell-blanks being shown in said Fig. 19.

The crank-shaft 62 is formed in one piece with two double cranks 68 and 68$^a$. (Shown in Figs. 2 and 4.) To the cranks 68 and 68$^a$ are connected by boxes 69 two depending arms 70, the lower ends of which are pivotally connected to a transverse vertically-movable bar 71, mounted in vertical slideways, so as to be movable up and down. To the under side of the transverse bar 71 is secured a series of seven punches 72 for punching the openings 73 and holes 74 in the upper paper blanks 75. (See Fig. 20, where one of these blanks is shown.) To the rear side is rigidly secured a cutter 76 (see Fig. 4) for cutting off the upper blanks after they have been punched and fed into the holding-jaws. 77 represents one of the female dies, adapted to receive the punches 72, and 76$^e$ is the lower member of the cutter 76.

The punches 72 and cutter 76, all being secured to the vertically-movable bar 71, are all operated at one and the same time by the mechanism heretofore described.

In describing the holding-jaws for receiving and holding the upper paper blanks 75 as they are fed into them reference is had to Figs. 4, 17, 18, 19, 20, and 21.

One of the holding-jaws 78 is rigidly secured to or formed in one piece with the chain-links 79 and 80, (see Fig. 23,) where one is shown detached from the pivoted jaw. It is provided at its inner or holding side with a series of vertical depressions or openings 81, which extend down through the holding-jaw. (See Figs. 21, 22, and 23.) To the links 79 and 80 of each holding-jaw is pivoted by pins 82 (see Fig. 19, where these pins are shown) a movable holding-jaw 83. These pins 82 are made removable, so the movable jaw can be entered between the links 79 and 80, and are either screwed in place or otherwise secured in any well-known way. The movable jaw 83 is also provided with a series of vertical depressions or recesses 84, which correspond with the recesses 81 in the holding-jaw 78.

The object of the recesses 81 and 84 (see Fig. 19) is to provide openings through which the mechanism passes when pushing the paper blanks 75 down into the paper blanks held in the clamping-jaws 45 and 46, as will fully appear farther on. The pivoted holding-jaws are also each provided with operating-bars 85, having their lower ends flat, adapted to slide on tracks 86, which close the jaws while on said tracks and open them again when off. (See Figs. 21 and 22.) These tracks and operating-bars are substantially of the same construction and operation as that described for the tracks 57 and operating-bars 56 and are removably secured to the frame 87. (See Figs. 3, 20, and 21.)

The blanks 75, after being punched and connecting-gearing and receive their movements from the spur-gear 105, which is rigidly secured to the shaft 99, an end view of which is shown in Fig. 4.

The gear-wheel 105 is rigidly secured to the shaft 99, and the disk-wheel 100 is loosely fitted on the said shaft and secured to the gear-wheel 105 by means of the bolts $1^g$, which pass through the curved elongated openings or slots $1^f$ in the gear-wheel 105, thereby rendering the said gear-wheel and disk-wheel capable of rotatable adjustment in relation to each other. The object of this adjustment is to provide the means for bringing the openings between the clamping or holding jaws directly in position to receive the paper as it is fed into them previous to cutting off the blanks substantially at or about the points H and G. (Shown in Figs. 3 and 4.)

To the top of the table is secured in the usual way by bolts two upright supporting-frames $1^h$. (See Figs. 2, 3, and 4.) Between the top portions of the frame-pieces $1^h$ is secured by bolts $1^i$ a cross-plate $1^j$. Between the lower portions of the frames $1^h$ is secured by bolts $1^k$ two bars $1^m$ and $1^n$, (see Figs. 3 and 4,) and to the upper cross-plate $1^j$ is rigidly secured, by depending screw-bolts $1^r$, a substantially square plate $1^s$.

Mounted in the cross-plate $1^j$ and the lower plate $1^s$ in vertical bearings $1^z$ is a vertical shaft $1^t$, to which is secured by a set-screw $1^v$ a forked bar $1^w$. One of the bolts $1^r$ passes easily through one end of the forked bar $1^w$, so it can move easily up or down thereon for the purpose of preventing the shaft $1^t$ from turning either way, while it has a free up-and-down movement. The shaft $1^t$ is prevented from turning in the portion $1^w$ by means of a feather $1^x$, made in the usual way. (See Fig. 3.)

To the forked end of the bar $1^w$ is pivoted by a pin $3^f$ a connecting-bar $2^f$. A forked bar $2^g$, having its forked ends provided with boxes $3^z$, is mounted on the shaft 10, (see Fig. 2,) so as to turn thereon, and is pivoted at its opposite end by a pin $2^h$ to the lower end of the connecting-bar $2^f$. (See Fig. 3.)

Mounted on the supporting-frames $1^h$ in boxes $2^h$ is a shaft $2^i$. On the outer end of the shaft $2^i$ is rigidly secured a spur gear-wheel $2^j$. The gear-wheel $2^j$ is in gear with a pinion $2^k$ on the shaft 10. (See Fig. 1.) The diameter of the pinion $2^k$ is made one-seventh of the diameter of the spur-wheel $2^j$. (Shown in Fig. 1.) On the shaft $2^i$ is mounted a cam-wheel $2^m$.

$2^n$ represents the cam thereon. Secured by a pin $2^r$ on the forked bar $2^g$ is a friction-roller $2^s$. (Shown in Fig. 3.) At the lower end of the vertical shaft $1^t$ is rigidly secured a metal plate $2^t$, having a series of strengthening-bars $2^v$ secured to its top side. (See Figs. 2, 3, and 4, where portions of this plate are shown.) To the bars $2^v$ and plate $2^t$ is secured by bolts $2^w$ a series of depending bars $2^x$, which I term "beaters." There are forty-two of these beaters, seven rows of six each.

A series of spiral springs $3^h$, secured to the top plate $1^j$ and the plate $2^t$, keep the plate $2^t$ normally in an upward position.

From the above description it will be seen that every time the cam-wheel $2^m$ makes one revolution the small cam $3^i$, immediately preceding and forming a part of the cam $2^n$, moves the beaters a short distance down, only far enough to allow the bars $3^j$, of which there are seven at each side, making fourteen in all, to reach down to the front side of the pivoted plates 88, so that a movement of the sprocket-chain will cause said plates to turn on the pins $88^a$ to the position shown by the dotted lines in Fig. 23. As the cam-wheel continues its movement in the direction of the arrow $t$ (see Fig. 3) it forces the beaters down through the openings 81 84 in the holding-jaws 78 and 83, and thereby pushes the upper paper blanks down into the openings in the lower paper blanks, as will be shown more clearly farther on.

It will be well to state here that when the points of the bars $3^j$ are moving the plates 88 the sprocket-chain with its holding-jaws has nearly completed one of its intermittent movements, and when the cam $2^n$ is pushing the beaters down far enough to move the paper blanks down the chain and holding-jaws are stationary.

On the shafts 41 and 96, inside of their sprocket-wheels, are rigidly secured two disk-wheels $3^k$, (shown in Figs. 3 and 4,) the object of which is to form a support upon which the lower ends of the operating-bars 56 and 85 rest as the jaws pass around said disks and thereby keep the holding and clamping jaws in their desired position or from opening too far.

Figure 27:
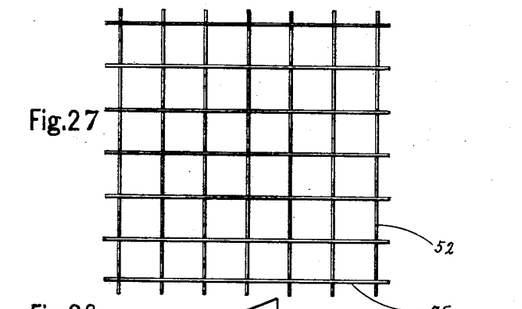
Fig. 27 represents a top plan view of a cell-case made by this machine.
Figure 28:
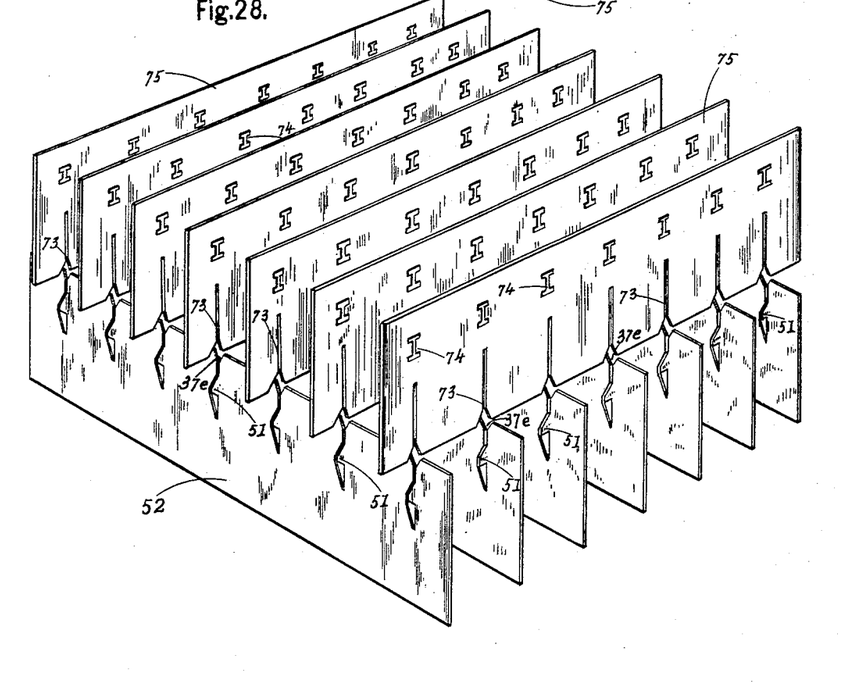

The operation of the machine is as follows: The paper-rolls, one of which is shown at $4^i$ in Fig. 4, are supported on standards $4^j$, which may be constructed in any well-known way, and the paper enters the machine simultaneously at the points 31 and 60. (Shown by dotted lines in Fig. 2.) The paper as it enters at both sides of the machine passes through substantially the same operations simultaneously while passing to and into the clamping and holding jaws. Referring to Fig. 3, as the paper 31 is fed into the machine by feed mechanism heretofore described the openings $37^e$ are first punched out. Then the paper is fed into the holding-jaws. Then the cutter 38 cuts it off. This blank, while other blanks back of it are passing through the same operation, is carried up and forward by the intermittent movements of the sprocket-chain and clamping-jaws step by step until it reaches the point $4^m$. (Shown in Fig. 3.) Now during the same time these operations are being performed the paper on the opposite side is passing through a similar series of operations and has reached the point $4^n$, (shown in Fig. 4,) seven of each of the clamping and holding jaws, including the jaw at the point $4^m$ and the six immediately back of it, (shown in Fig. 3,) and also the jaw at the point $4^n$ and the six back of it, (shown in Fig. 4,) supporting the paper blanks, the openings in the seven upper blanks being directly over the openings in the seven lower blanks, the upper and lower blanks being at right angles to each other and being held in their respective holding devices, so as to form a square. They are now in the position to receive the action of the beaters heretofore described, which move down during the time of intermission between the movements of the chain when the first blank reaches the point 4$^m$ in Fig. 3 and 4$^n$ in Fig. 4, the pivoted plates 88 having been turned out of the way to allow them to pass through. The beaters in thus pushing the seven blanks down through the upper chain into the openings in the seven blanks held in the lower chain thereby complete a cell-case. The position of the lower and upper series of parallel paper blanks is clearly shown in the perspective view in Fig. 28; but it will be noticed that before the beaters can force the upper blanks down into the lower strips the hook portions 51 must be turned out of the way or to one side, substantially as shown at 51$^1$ in Figs. 12 and 14. When the clamping-jaws are closed, as in Fig. 7, and a blank is between them, its hook portions 51 will be curved outward by the outwardly-extending forming portions 49, as shown in Fig. 14, thereby leaving a free clear opening, as shown at 51$^1$ in Fig. 12, for the upper blank to pass down into. When the clamping-jaws open, the parts 51 spring back substantially into their normal position in the blanks, and in doing so move into openings in the upper blanks made to receive them, and thereby fasten all parts of the cell-case securely together. The cell-case thus completed is in a square form, substantially as shown in Fig. 27, and is carried forward step by step until it reaches the point where the chain passes around the sprocket-wheel 43, when the clamping-jaws open and successively leave each row of egg-cells of the case, substantially like the teeth of a pair of gear-wheels leaving each other in succession while in operation, until the whole cell-case is free and deposited upon the table at the rear of the chain.

I claim as my invention—

1. In a machine for making cell-cases, a supporting base or table, having two feeding, punching, and cutting mechanisms located on the table at right angles to each other, means for operating them and for holding the paper to be fed therein, one strip being moved in a direction transversely to the movement of the other, in combination with two endless sprocket-chains mounted on sprocket-wheels at right angles to each other on shafts set in boxes on the frame of the machine and carrying clamping and holding jaws for receiving, holding and delivering the cell-case blanks, parts of each sprocket-chain passing between the upper and lower portions of the other, and means for giving each sprocket-chain and its coöperating mechanism, an intermittent movement, for the purposes described.

2. In a machine for making cell-cases, the combination with the beaters, the two endless carrier sprocket-chains and sprocket-wheels mounted at right angles to each other, their holding and clamping jaws and means for giving them an intermittent movement, of means for turning the hook portions 51$^1$, of the lower cell-blanks to one side out of the way while the upper cell-blanks are being forced into place by the beaters, substantially as described.

3. In a machine for making cell-cases, the combination with the feeding, punching and cutting mechanism, and the lower endless sprocket-chain mounted on sprocket-wheels on shafts set in bearings on the frame of the machine and carrying a series of clamping-jaws, the movable jaws of each clamping-jaw carrying an operating-bar, of means for giving the sprocket-chain and its clamping-jaws an intermitting forward movement, circular disks mounted on the sprocket-wheel shaft opposite the feeding, punching and cutting mechanism, over which the lower ends of the clamp-jaw-operating bars move and keep the jaws open to receive the paper blank from the cutting mechanism, and tracks over which the operating-bars pass and close the clamping-jaws and hold the lower paper blanks in parallel rows in position to receive the upper blanks, substantially as described.

4. In a machine for making cell-cases, the combination with two endless sprocket-chains mounted on sprocket-wheels at right angles to each other, on shafts set in boxes on the supporting-table, means for giving the required intermittent movement to each sprocket-chain, and the feeding, punching and cutting mechanism, of a series of clamping-jaws mounted at equal distances apart on the lower sprocket-chain, and means for operating them, for receiving and carrying the lower cell-blanks as they pass in succession, into each clamping-jaw from their feeding, punching and cutting mechanism, a series of holding-jaws and means for operating them mounted on the upper sprocket-chain, for receiving and carrying the upper cell-blanks as they pass into each holding-jaw from their feeding, punching and cutting mechanism, and mechanism as described for forcing the upper parallel series of cell-blanks down into engagement with a lower parallel series of cell-blanks assembled at right angles to the upper series.

5. In a machine for making cell-cases, two sprocket-chains mounted on sprocket-wheels in suitable boxes on the machine so that one side of each chain extends at right angles to and through between the upper and lower sides of the other, and means for giving said chains a simultaneous intermittent forward movement, in combination with a series of clamping-jaws mounted upon the lower chain and means for operating them, for receiving and carrying a series of lower cell-blanks in parallel order, a series of holding-jaws and means for operating them mounted on the upper chain for receiving and carrying a corresponding series of upper cell-blanks in a corresponding parallel order at right angles to and above the lower series of cell-blanks, preparatory to forcing them down into engagement with the lower series of cell-blanks and thereby completing a cell-case, substantially as described.

6. In a machine for making egg-cases, the combination with the upper endless sprocket-chain, the beaters and their operating mechanism for forcing the upper cell-blanks into engagement with the lower cell-blanks, of a series of holding-jaws mounted on the upper endless sprocket-chain, each holding-jaw being provided with a series of vertical recesses which, when the two members of the jaws are closed, form vertical openings through which the beaters operate for the purposes described.

7. In a machine for making cell-cases, the combination with the operating-bars, the clamping-jaws, the sprocket-chain and its operating mechanism, of disk-wheels mounted on the sprocket-wheel shaft at the head of the sprocket-chain carrying said clamping-jaws, for limiting the opening of the clamping-jaws as the operating-bars are carried by the sprocket-chain around said disks.

8. In a machine for making cell-cases, the combination with the operating mechanism, the shafting and sprocket-wheels mounted at the ends of said shafting of two duplicate sprocket-chains, arranged parallel to each other and adapted to engage with the sprocket-wheels on the shafting, a base portion arranged between and extending from each link on one chain to its companion link on the opposite chain so as to locate the said base portion at substantially right angles to the running direction of the chains, and a series of clamping-jaws mounted on said base portions.

9. In a machine for making cell-cases, the combination with the operating mechanism and sprockets mounted on the shafting thereof, of a clamping-jaw sprocket-chain, each link of which consists of a plurality of clamping-jaws arranged along and extending from a base portion, a plurality of movable jaws cooperating with said clamping-jaws, and chain-links at each end of said base portion, fitting said sprockets.

10. In a machine for making cell-cases, a base portion, a series of clamping-jaws extending upward from the base portion, and provided with openings 50, and a chain-link rigidly secured to each end of the said base portion, in combination with a series of movable clamping-jaws extending upward from a base portion pivoted between the chain-links, an inward-extending curved portion on each jaw, and means for operating them, for turning outward the hook portion 51, on the lower blanks for the purposes described.

11. In a machine for making cells, the combination with the operating mechanism of devices forming a portion of said operating mechanism for bending and holding the hook portions of the lower or male blanks at substantially right angles thereto during the interval of time required to force or press the upper or female blanks into proper engagement with the said lower blanks.

12. In a machine for making cell-cases, the combination with the beaters, the upper holding-jaws, the sprocket-chain upon which they are mounted and means for operating them, of the pivoted plates 88, and means for turning them out of the way to allow the upper cell-blanks to be forced down through the holding-jaws by the beaters, substantially as described.

13. In a machine for making cell-cases, the combination with the operating mechanism, of means substantially as described for bending the hook portions of the male blanks out of the way to form an unobstructed opening for the female blanks to pass into.

14. A machine for making cell-cases, consisting of mechanism for feeding, punching, cutting and assembling an upper and lower series of cell-blanks simultaneously, mechanism for temporarily turning the hook portions of the lower blanks sufficiently to leave free openings, and mechanism for forcing the upper series of blanks into engagement with the lower series to form a cell-case.

15. In a machine for making cell-cases, the combination with the operating mechanism, of a series of combined sprocket-chain links and clamping-jaws, each of said series consisting of a base portion, fixed jaws rigidly depending from said base portion, a series of pins projecting from said base, at substantially right angles to the fixed jaws and a series of movable jaws.

16. In a machine for making cell-blanks, the combination of two endless sprocket-chains mounted at right angles to each other on sprocket-wheels and shafts located on the machine so that one side of each chain passes between the upper and lower sides of the other, mechanism for operating said sprocket-chains, sprockets and shafts intermittently, feeding mechanism, clamping and holding jaws mounted on said chains for receiving the paper blanks fed to each simultaneously and simultaneously carrying a series of lower and upper transverse paper cell-blanks and holding them, and means for releasing and moving the transverse cell-blanks down into engagement with the lower cell-blanks during one of said intermissions, substantially as described.

17. In a machine for making paper blanks, a combined sprocket-chain link and clamping-jaw, consisting of a series of clamping-jaws 45, having side openings 50, extending up from a base portion 45ᵃ, provided with a series of pins 45ᵉ, and a chain-link rigidly secured to each end thereof, in combination with a corresponding series of clamping-jaws 46, extending upward from a base portion 46ᵃ, pivoted between the chain-links, the base portion 46ᵃ, having a series of openings 45ᵈ, to receive the pins 45ᵉ, as described.

18. In a machine for making cell-cases, the combination with the operating mechanism, of a series of combined sprocket-chain links and clamping-jaws, each of said series consisting of the base portions, 45ᵃ, jaws 45, chain-links, 44 44ᵃ, and pins 45ᵉ, all formed in one integral piece, and the movable jaws, 46ᵃ, pivotally connected to said base portions.

19. In a machine for making cell-cases, the combination with the feeding, punching and cutting mechanism, of two endless sprocket-chains mounted on sprocket-wheels set in boxes on the machine-frame, the chains being mounted at right angles to each other so that one side of each moves between the upper and lower sides of the other; a series of holding and clamping jaws and means for operating them mounted on said chains, means for giving said chains a simultaneous step-by-step movement with simultaneous stationary intervals between each step, for receiving and carrying a series of seven upper and seven lower cell-blanks to a point where the seven upper cell-blanks are located directly over and at right angles to the lower cell-blanks, and a series of beaters and means for operating them for forcing the upper cell-blanks down into engagement with the lower cell-blanks while the two sprocket-chains and their holding and clamping jaws remain stationary, substantially as described.

20. In a machine for making cell-cases, the combination with the beater-frame and its connecting mechanism, of the vertical bars 3ʲ, attached to said beater-frame so as to operate with it, and the pivoted plates 88, and cam 3ⁱ, for operating it, substantially as described.

21. A machine for making cell-cases, consisting of the following elements, means located at right angles to each other for feeding, punching and cutting an upper and lower series of cell-blanks simultaneously, means for receiving and assembling the lower cell-blanks in parallel rows during regular intervals of time until a sufficient number has been assembled, means for simultaneously receiving and assembling during the same intermissions of time, a corresponding series of upper transverse cell-blanks, and means for releasing and forcing the upper series of cell-blanks down into engagement with the lower cell-blanks during the interval that follows the completion of the two series of cell-blanks and thereby completing a cell-case as above set forth.

22. In a machine for making cell-cases, the combination of step-by-step mechanism for feeding, cutting, punching and assembling a lower series of cell-blanks and simultaneously therewith, an upper series of cell-blanks, mechanism for stopping said assembling mechanism for a brief interval, and mechanism for forcing said upper series of blanks into engagement with said lower series during said interval.

23. In a machine for making cell-blanks, the combination with the sprocket-chains and mechanism for intermittently operating the same, of mechanism for feeding the paper blanks, mechanism mounted on said sprocket-chains for receiving, holding and carrying an upper and lower series of cell-blanks, and mechanism for releasing and directing the upper series into engagement with said lower series during an intermission of the sprocket-chain-operating mechanism.

24. In a machine for forming cell-blanks, the combination with the feeding, cutting and punching mechanism, of mechanism operated intermittently for assembling an upper series and lower series of blanks simultaneously, and mechanism for bending the hook portions of the male blanks to afford a free passage for the female blanks into engagement with said male blanks.

25. In a machine for forming cell-cases, the combination of step-by-step mechanism for feeding, cutting and punching an upper and lower series of cell-blanks coincidently, for assembling the upper series of blanks in proper position above the lower series for bending the hooked portions on the lower series at an angle therefrom, for forcing said upper series into engagement with said lower series, and for releasing the hooked portions and allowing them to spring into engagement with and lock the upper series of blanks to the lower series to form a complete cell-case.

26. In a machine for forming cell-cases, the combination of step-by-step mechanism for feeding the paper into the machine, for cutting the strips, for punching said strips into blanks, and for assembling a lower series of cell-blanks in parallel order, step-by-step mechanism for feeding the paper into the machine, for cutting the strips, for punching said strips into blanks, and for assembling an upper series of cell-blanks in parallel order, vertically above and transversely to the lower series, each step on the upper series being performed coincident with its companion step on the lower series, mechanism for bending portions on the lower blanks out of the way to leave a free passage, mechanism for forcing said upper series into engagement with its lower series, and mechanism for releasing said bent portions and allowing them to spring into engagement with the upper series thus locking the two series together and forming a complete cell-case.

27. In a machine for making cell-cases, the combination of mechanism for forming and assembling an upper and lower series of cell-blanks, mechanism for turning the locking portions on one series sufficiently to leave free openings for the introduction of the other series and mechanism for forcing said upper and lower series of blanks into engagement to form a cell-case.

28. In a machine for forming cell-cases, the combination of mechanism for feeding, punching and cutting a series of upper blanks one by one successively, mechanism for feeding, punching, and cutting a series of lower blanks, one by one successively, mechanism for assembling a suitable number of said upper blanks in parallel order, and a similar number of lower blanks in parallel order, vertically below and transversely to the upper blanks, and mechanism for forcing said upper series vertically downward into engagement with said lower series.

29. In a machine for forming cell-cases, the combination of mechanism for feeding, cutting and punching one by one the blanks of one series and simultaneously therewith the blanks of the other series, mechanism for assembling the blanks of each series in parallel order, and one series transversely to the other, and mechanism for forcing the two series into engagement, to form a complete cell-case.

HENRY C. HERR.

Witnesses:
E. J. SCHOOLCRAFT,
W. L. JENKS.